G　M　F　M　G

United States Patent Office 3,293,417
Patented Dec. 20, 1966

3,293,417
TRAVEL-RESPONSIVE CONTROL DEVICES FOR REGULATION OF TRANSLATORY OR ROTARY MOTION
Walter Heissmeier, Nurnberg, Germany, assignor to Siemens-Schuckertwerke Aktiengesellschaft, Berlin-Siemensstadt, Germany, a corporation of Germany
Filed Mar. 6, 1963, Ser. No. 263,352
Claims priority, application Germany, Mar. 6, 1962, S 78,344
7 Claims. (Cl. 235—151.11)

My invention relates to travel-responsive control devices, and particularly, but not exclusively, to machine-tool feed controls which are automatically regulated in accordance with stored data.

Various types of travel-responsive control devices are known. For example according to copending application Serial No. 206,834, now abandoned, assigned to the assignee of this application, an apparatus for program control of translatory and rotary travel, such as of feed motions in machine tools, comprises a soft-magnetic line raster which virtually constitutes a "measuring stick" or measuring scale. The latter does not comprise impressed or remanent magnetization and operates in a passive manner. One or more sensing heads with sensing gaps scan the raster transverse to the raster lines and interstices. The respective sensing gaps are excited independently and spaced with respect to each other an odd multiple of raster line divisions. At any moment during the travel responded to the Hall voltage depends upon the degree of bridging caused by the raster lines across the sensing gaps and hence is dependent upon the position of the sensors relative to the raster. In response to such a device, tools may be moved to desired preselected positions with a high degree of accuracy, by means of known programming devices having resolvers or rotary-motion transmitting electric systems of the synchro type.

Depending on the desired degree of accuracy, one or more resolver units, to which the before-mentioned program control device is connected as a fine-speed unit, are used. Further details on resolver units are disclosed in the article "Rationalisierung durch numerische Steuerungen für Werkzeugmaschinen" ("Rationalization for Machine Tools by Numerical Control") which was published in the August 1961 issue of the Siemens-Zeitschrift, pages 567 to 574.

It is known that such program control devices may be simplified by substituting for the resolver units measuring scales, not only for both fine but also for coarse measuring units, which are scanned by means of suitable sensing devices. Control devices of this type having measuring scales in the form of windings, and comprising three different calibrations of different periods, constitute the basis of the well known Inductosyn system. There the measuring apparatus consists of a measuring scale carrying a finely distributed flat winding, and a slider equipped with a plurality of flat coil systems. Its mode of operation corresponds to that of a resolver, except that it may be placed directly upon the carriage of a given machine. The slider of the measuring device corresponds functionally to the stator of a receiver resolver. It is passed over the measuring scale, being spaced therefrom only by a small air gap. It induces the signal voltage into the winding of the measuring scale, which corresponds to the rotor of the receiver-type resolver.

It is an object of my invention to provide motion control means having a considerably simpler construction than heretofore. More particularly, it is an object to provide a travel control apparatus dispensing with resolver-type measuring systems operating on the principle of rotary-motion transmitting electric systems of the synchro type including the gear means required therefor, while nevertheless avoiding the need for current supply means for measuring scales as necessary in conventional systems.

According to a feature of my invention I mount, on one of two structures to be moved relative to each other, a soft-magnetic measuring scale or raster having a plurality of calibration divisions (raster divisions or raster sections) of a different periodicity or frequency, and I evaluate each by means of a sensing device for fine, medium and coarse control.

According to another feature the measuring scales correspond to those disclosed in the above-mentioned application Serial No. 206,834. More particularly according to this feature I cement a soft-magnetic foil upon a non-magnetic base and transfer the calibrating or raster divisions onto the foil by photographic means and by a subsequent etching operation. I shape the fine-speed section in the form of a line raster, using triangular and double-rhombic rasters respectively for the medium and coarse speed divisions. In the case of double-rhombic rasters I preferably apply the sensing heads in a direction perpendicular to the direction of the measuring scale in such a manner that the sensing gap will be located in the symmetry axis of the rhombic raster. The measuring scales may be designed to be of a rectilinear or of an arcuate configuration.

Other objects and advantages of my invention will become obvious from the following detailed explanation of the present invention, reference being had to the drawings showing diagrammatic illustrations of several embodiments thereof wherein.

Figure 1:
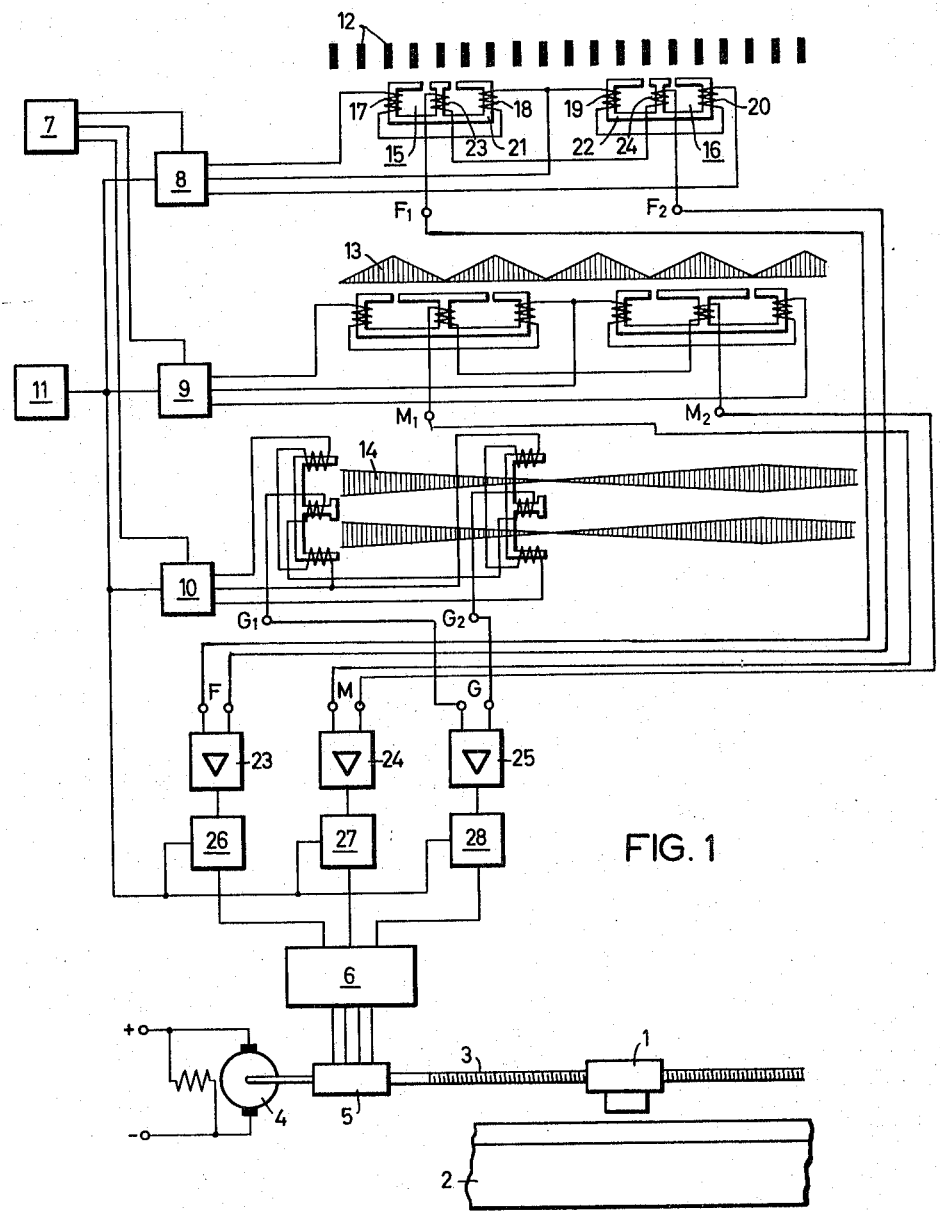
FIG. 1 is a partially schematic and partially block diagram of a control system embodying features of this invention.

In FIG. 1, the system controls displacement of the carriage 1 of a machine tool relative to its base 2. A spindle 3 imparts a translatory movement to the carriage 1 and is driven by motor 4 via gear means 5 comprising magneto-couplings which are connected thereto. The motor 4 may be a direct-current motor or an induction motor, either continuously running at constant speed. The coupling and gear means are not illustrated in detail in the drawing. A signal-evaluating device 6 controls the magneto-couplings after evaluating the signals of the individual measuring units.

Pushbuttons, punched cards or other known means in an input unit 7 pre-set the desired position of the carriage. The input unit 7 actuates individual programming devices 8, 9 and 10 for fine, medium and coarse speed. The programminig devices comprise programming transformers, such as disclosed in U.S. Patent No. 2,849,668, which supply two voltages corresponding to the sine or cosine, respectively of a predetermined angular value. An oscillator 11 supplies each programming device 8, 9, 10 with a voltage having a suitable frequency, for instance 10 kilocycles per second.

A soft-magnetic measuring scale comprising three calibration or raster sections 12, 13, 14, fine, medium and coarse respectively, is provided on the base 2 of the machine. Two sensing heads 15 and 16 are mounted on the carriage 1 of the machine and passed along the line raster 12. With respect to design and arrangement, the sensing heads substantially correspond to those illustrated in FIG. 1 of the above-mentioned application Serial No. 206,834, with the exception that inductive sensing has been selected in the case of the present embodiment. The output voltages of the programming device 8 are each supplied to two excitation windings 17, 18 and 19, 20, mounted on the outer legs of cores 21 and 22 of the sensing heads 15, 16, respectively. The center legs of the cores carry windings 23, 24 which are serially interconnected and are connected to the terminals $F_1$, $F_2$ of the fine-speed unit.

Correspondingly, the output voltage of the sensing heads of the medium-speed unit 13, comprising a triangular raster, is applied to terminals $M_1$ and $M_2$.

For the coarse speed, use has been made of a raster section having the form of a double-rhombic raster, to avoid large sensing heads. The two sensing heads, the general structure of which fully corresponds to that of the sensing heads 15 and 16 of the fine-speed unit, pass across the raster section in a direction perpendicular to the direction of the measuring scale. The output voltage is applied to terminals $G_1$ and $G_2$.

The output voltages at $F_1$, $F_2$ and $M_1$, $M_2$ and $G_1$, $G_2$ supplied by the respective sensing heads are each connected to the inputs F, M and G of amplifiers 23, 24 and 25 in the individual measuring channels. Phase-sensitive rectifier devices 26, 27 and 28 rectify the amplified voltages and supply them to the signal evaluating means 6. Programming devices, amplifiers and demodulators employed in the individual measuring units are of the conventional kind known for control devices of this type.

Figure 2:
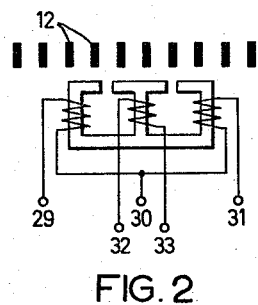
FIGS. 2, 3 and 4 are schematic diagrams of sensing heads shown with three raster divisions of different frequency applicable to the system of FIG. 1.

Instead of two sensing heads each of which comprises two sensing gaps, another embodiment of the invention uses a single sensing head. FIG. 2 illustrates such a sensing head for the fine-speed raster section 12. The structure of the head corresponds to that illustrated in FIG. 2 of the above-mentioned application Serial No. 206,834. The output voltages of the programming transformer of device 8 are applied to the terminals 29, 30 and 31, whereas the sensing-head voltage is available at terminals 32 and 33.

Figure 3:
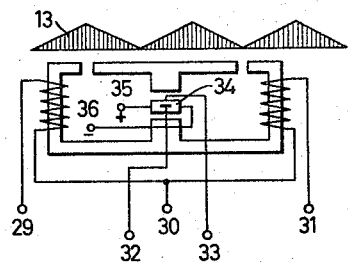

FIG. 3 illustrates a medium-speed unit which according to still another embodiment of the invention may be used as a sensing head in place of those in FIG. 1. It comprises a Hall generator 34 instead of an inductive sensing head, located in the center leg of the core, and receiving constant control current from terminals 35 and 36. The Hall voltage is available at terminals 32 and 33 and constitutes the output voltage of the sensing head.

Figure 4:
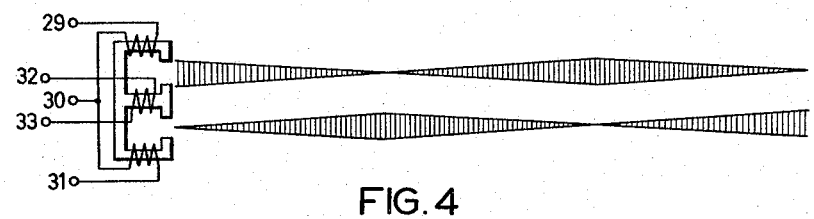

FIG. 4 illustrates a coarse speed unit that the invention contemplates using as a single sensing head in place of those in FIG. 1. For this purpose the two portions of the double-rhombic measuring scale are displaced a half period relative to each other.

Figure 5:
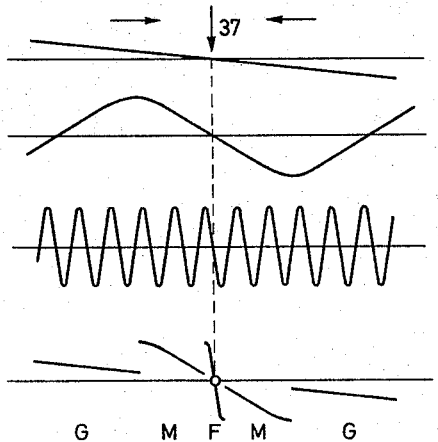
FIG. 5 is a group of voltage-time graphs illustrating the operation of the present invention.

FIG. 5 comprises three voltage-position graphs corresponding respectively to the coarse, medium and fine speed unit outputs in FIG. 1. A fourth voltage-position graph is a partial composite of the first three at the intersection at the pre-set position. The mode of operation of the device of the present invention is as follows.

The input unit 7 and the programming devices 8, 9 and 10 pre-set a pre-selected desired position for the carriage. This is indicated in FIG. 5 by the arrow 37. While the unit having the coarser speed gives the direction signal, the signals emitted by the units having a finer speed are suppressed until the signal voltage has decreased below a predetermined value. Switch-over to the finer speed is effected when its control signal has approximately its maximum value.

As shown in FIG. 5, in connection with the approach to the pre-selected desired position from both directions, it is initially the coarse speed G, then the medium speed M and finally the fine speed F which controls the adjustment of the carriage into said pre-selected desired position. Switching means for shifting from one speed to the other are known in the art and may, for example, be part of the signal evaluating device 6.

Figure 6:
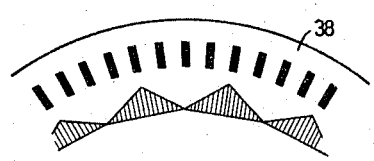
FIG. 6 is a partial view of a disc upon which two raster divisions are placed in accordance with an embodiment of the invention.

FIG. 6 illustrates in part an embodiment of the invention wherein two measuring-scale divisions are mounted upon a circular disc 38 in a manner analogous to rectilinear measuring scales. More scale divisions are also contemplated. The sensing heads of FIG. 1 are suitable for use with a disc of the circular type.

According to another embodiment of the invention each sensing head is provided with a plurality of parallel-connected sensing gaps as explained in connection with the above-mentioned application Serial No. 206,834. This produces a mean value of output voltage which is averaged over a wider range. Also according to another embodiment the current supply for the Hall generators within the sensing heads is applied otherwise. For example, the oscillator 11 is dispensed with, and the core excited by means of direct voltages which are modified to correspond with the desired pre-selected value. In contradistinction to the inductive sensing head the Hall generator is also capable of registering direct-current fields.

The couplings 5 in FIG. 1 possess for the three speed units in coarse, medium and fine control, gearing of three different transmission ratios and also a corresponding magnetic clutch by means of which the spindle 3 is connected to the particular gearing. The signal evaluating device 6 possesses one bistable flip-flop stage for each speed. The flip-flop output signals actuate the respective clutches as soon as the respective signals furnished from the individual phase-sensitive rectifiers 26, 27 and 28 exceed a given value. These bistable flip-flops have a conventional design as illustrated in FIG. 7, which is a schematic diagram of a flip-flop used in the device 6.

Figure 7:
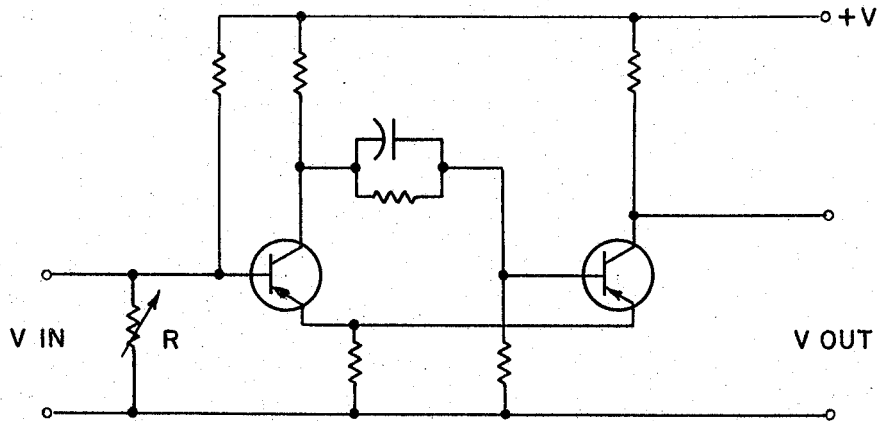
FIG. 7 is a circuit diagram of an embodiment of a flip flop which may be utilized in the signal evaluating device 6 of FIG. 1.
Figure 8A:
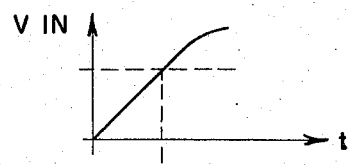
FIGS. 8a and 8b are graphical presentations of voltages illustrating the operation of the flip flop of FIG. 7.
Figure 8B:
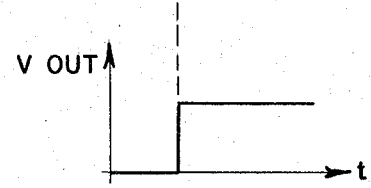

FIGS. 8a and 8b are voltage time graphs showing the operation of the bistable flip-flop in FIG. 7. A signal occurs at the output of the bistable flip-flop when a given input value is exceeded. The input value is adjustable by resistor R so that the sensitivity with which the clutches are switched on can be selected.

According to another embodiment of the invention the clutches are dispensed with and the spindles 3 are directly connected with the drive motor. The device 6 consists simply of a regulating amplifier of conventional design which acts either upon the field excitation or upon the armature current of the motor 4.

While embodiments of the invention have been described in detail it will be obvious to those skilled in the art that the invention may be practiced otherwise without departing from its spirit or scope.

I claim:

1. A travel-responsive control apparatus for positioning two relatively movable structures relative to each other, said control apparatus comprising a plurality of soft-magnetic rasters of different periods on one of said structures, programming means for determined programs indicating determined positions of said movable structures relative to each other, a plurality of sensing-head means for each raster on the other structure, each of said sensing-head means having two sensing gaps being mutually displaced along the rasters an odd multiple of the period of the corresponding raster, excitation means for independently exciting the sensing gaps according to a predetermined program of said programming means, a plurality of magnetic means responsive to the magnetic condition of the respective sensing-head means due to the excitation means and the effect of the raster, and output means coupled to said magnetic means and to said programming means and responding sequentially to said magnetic means for comparing the output at said magnetic means to said program and for moving one structure relative to the other to a determined relative position indicated in a determined program of said programming means.

2. A travel-responsive control apparatus for positioning relatively movable rasters and sensing heads relative to each other, said control apparatus comprising programming means programming determined positions of said sensing heads and rasters relative to each other, a plurality of sensing heads having gaps, excitation means coupled to said programming means for said heads, a plurality of soft-magnetic measuring-scale rasters movable together past said heads, two gaps being located adjacent odd multiples of the division calibration of each measuring-scale raster, said rasters having different division periods corresponding to varying degrees of coarseness, and control means coupled to said programming means and to selected ones of said heads and responding to the magnetic condition of said heads for controlling the mutual positions of said rasters and heads to position said rasters and heads in a determined relative position programmed by said programming means.

3. A travel-responsive control apparatus for positioning relatively movable rasters and sensing heads relative to each other, said control apparatus comprising programming means programming determined positions of said sensing heads and rasters relative to each other, a plurality of sensing heads having gaps, excitation means coupled to said programming means for said heads, three soft-magnetic measuring-scale rasters movable together past said heads, two gaps being located adjacent odd multiples of the division calibration of each measuring-scale raster, said rasters having different division periods corresponding to fine, medium and coarse, and control means coupled to said programming means and to selected ones of said heads and responding to the fine, medium and coarse magnetic condition of said heads for controlling the mutual positions of said rasters and heads to position said rasters and heads in a determined relative position programmed by said programming means.

4. A travel-responsive control apparatus for positioning relatively movable rasters and sensing heads relative to each other, said control apparatus comprising programming means programming determined positions of said sensing heads and rasters relative to each other, a plurality of sensing heads having gaps, excitation means coupled to said programming means for said heads, a plurality of soft-magnetic measuring-scale rasters movable together past said heads, one of said rasters being of triangular configuration, two gaps being located adjacent odd multiples of the division calibration of each measuring-scale raster, said rasters having different division periods corresponding to varying degrees of coarseness, and control means coupled to said programming means and to selected ones of said heads and responding to the magnetic condition of said heads for controlling the mutual positions of said rasters and heads to position said rasters and heads in a determined relative position programmed by said programming means.

5. A travel-responsive control apparatus for positioning relatively movable rasters and sensing heads relative to each other, said control apparatus comprising programming means programming determined positions of said sensing heads and rasters relative to each other, a plurality of sensing heads having gaps, excitation means coupled to said programming means for said heads, a plurality of soft-magnetic measuring-scale rasters movable together past said heads, one of said rasters being in the form of two parallel rhombic raster portions, two gaps being located adjacent odd multiples of the division calibration of each measuring-scale raster, said rasters having different division periods corresponding to varying degrees of coarseness, and control means coupled to said programming means and to selected ones of said heads and responding to the magnetic condition of said heads for controlling the mutual positions of said rasters and heads to position said rasters and heads in a determined relative position programmed by said programming means.

6. A travel-responsive control apparatus for positioning relatively movable rasters and sensing heads relative to each other, said control apparatus comprising programming means programming determined positions of said sensing heads and rasters relative to each other, a plurality of sensing heads having gaps, excitation means coupled to said programming means for said heads, a plurality of soft-magnetic measuring-scale rasters movable together past said heads, one of said rasters being in the form of two parallel rhombic raster portions, two gaps being located adjacent odd multiples of the division calibration of each measuring-scale raster, said rasters having different division periods corresponding to varying degrees of coarseness, and control means coupled to said programming means and to selected ones of said heads and responding to the magnetic condition of said heads for controlling the mutual positions of said rasters and heads to position said rasters and heads in a determined relative position programmed by said programming means, the sensing heads corresponding to the rhombic raster portions being arranged perpendicular to the path of the raster so that the sensing gaps are positioned within the axis of symmetry of the rhombic raster portions.

7. A travel-responsive control apparatus for positioning relatively movable rasters and sensing heads relative to each other, said control apparatus comprising programming means programming determined positions of said sensing heads and rasters relative to each other, a plurality of sensing heads having gaps, excitation means coupled to said programming means for said heads, a rotatable circular disc, a plurality of soft-magnetic measuring-scale rasters movable together past said heads, said rasters being of circular disposition and mounted on said disc, two gaps being located adjacent odd multiples of the division calibration of each measuring-scale raster, said rasters having different division periods corresponding to varying degrees of coarseness, and control means coupled to said programming means and to selected ones of said heads and responding to the magnetic condition of said heads for controlling the mutual positions of said rasters and heads to position said rasters and heads in a determined relative position programmed by said programming means.

References Cited by the Examiner

UNITED STATES PATENTS

| | | | |
|---|---|---|---|
| 2,311,142 | 2/1943 | Turrettini | 90—13.99 |
| 2,905,874 | 9/1959 | Kelling | 340—347 |
| 3,068,386 | 12/1962 | Jaeger et al. | 90—13.99 |
| 3,182,305 | 5/1965 | Wolff | 340—347 |

OTHER REFERENCES

Kliever: "Automatic Machining—A View and a Preview, Part III, Ways To Measure Position and Size," Control Engineering, Nov. 1955, pages 77–80 (page 78 relied on), 340–347.

MALCOLM A. MORRISON, *Primary Examiner.*

K. W. DOBYNS, *Assistant Examiner.*